(12) United States Patent
Chen

(10) Patent No.: US 6,731,508 B2
(45) Date of Patent: May 4, 2004

(54) COMPUTER ENCLOSURE WITH DISK DRIVE BRACKET

(75) Inventor: Yun-Lung Chen, Tu-Chen (TW)

(73) Assignee: Hon Hai Precision Inc. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/170,605

(22) Filed: Jun. 11, 2002

(65) Prior Publication Data
US 2003/0198013 A1 Oct. 23, 2003

(30) Foreign Application Priority Data
Apr. 17, 2002 (CN) .......................................... 2227005 U

(51) Int. Cl.[7] .................................................. G06F 1/16
(52) U.S. Cl. .......................... 361/727; 361/685; 361/724
(58) Field of Search ................................. 361/685, 683, 361/724–727; 312/332.1, 333

(56) References Cited

U.S. PATENT DOCUMENTS 5,327,323 A * 7/1994 Yeom et al. ................. 361/685
5,774,330 A * 6/1998 Melton et al. ............... 361/683
6,525,930 B1 * 2/2003 Rumney ...................... 361/685
2003/0076652 A1 * 4/2003 Ahn ............................. 361/683

* cited by examiner

Primary Examiner—Darren Schuberg
Assistant Examiner—Anthony Q. Edwards
(74) Attorney, Agent, or Firm—Wei Te Chung

(57) ABSTRACT

A computer enclosure includes a front panel (10), a disk drive bracket (20) and a bottom panel (30). The front panel includes two opposite side plates (11) and a bottom flange (12). A bottom portion of each side plate forms an L-shaped securing portion (111) defining a locking hole (113). The disk drive bracket includes two sidewalls (22). A front end of a bottom portion of each sidewall defines a locking hole (221). Rearwardly of the locking hole, the bottom portion of the sidewall is bent to form a rail (222). The bottom panel includes two guiding channels (31) on opposite lateral sides thereof. In assembly, the disk drive bracket is secured to the front panel. The rails of the disk drive bracket are then slid into the guiding channels of the bottom panel, to attach the combined front panel and disk drive bracket to the bottom panel.

18 Claims, 4 Drawing Sheets

COMPUTER ENCLOSURE WITH DISK DRIVE BRACKET

BACKGROUND OF THE INVENTION

1. Field of the Invention

The present invention relates to a computer enclosure, and particularly to a computer enclosure with a disk drive bracket mounted between a first panel and a second panel.

2. Description of the Related Art

Personal computer (PC) enclosures are nowadays generally being made as light, thin, short and compact as possible. Conventionally, a disk drive bracket of an enclosure is integrally formed on a bottom panel of the enclosure, or separately manufactured and secured on the bottom panel with rivets or screws. Once the enclosure is assembled, there is usually little or no room to perform maintenance, replacement or expansion of components inside the enclosure. Circuitry under or adjacent to the disk drive bracket cannot be easily inspected. Even where inspection is possible, adjacent components are prone to be accidentally damaged during the inspection. In many instances, the disk drive bracket needs to be removed in order to perform maintenance, replacement or expansion. Such removal is tedious and time-consuming.

Taiwan Patent Applications No. 308320 and No. 301423 respectively disclose disk drive brackets pivotally attached to computer enclosures. This simplifies assembly and disassembly of the enclosures. However, these kinds of disk drive brackets need to be supported by hand when rotated into or out from the enclosure. Moreover, after being rotated out to a self-supported position, the disk drive bracket is located above the circuit board. The confined space in the enclosure still makes performance of maintenance, replacement or expansion inconvenient.

SUMMARY OF THE INVENTION

Accordingly, an object of the present invention is to provide a computer enclosure with a disk drive bracket which is easily assembled and disassembled and therefore facilitates maintenance, replacement or expansion of components inside the enclosure.

To achieve the above object, a computer enclosure in accordance with the present invention comprises a front panel, a disk drive bracket and a bottom panel. The front panel comprises two opposite side plates and a bottom flange. A bottom portion of each side plate forms an L-shaped securing portion defining a locking hole. The disk drive bracket comprises two sidewalls. A front end of a bottom portion of each sidewall defines a locking hole, corresponding to the locking hole of a respective one of the side plates of the front panel. Rearwardly of the locking hole, the bottom portion of the sidewall is bent to form a rail. The bottom panel comprises two guiding channels on opposite lateral sides thereof. In assembly, the disk drive bracket is secured to the front panel. The rails of the disk drive bracket are then slid into the guiding channels of the bottom panel, to attach the combined front panel and disk drive bracket to the bottom panel.

Other objects, advantages and novel features of the present invention will be drawn from the following detailed description of preferred embodiments of the present invention with attached drawings, in which:

DESCRIPTION OF THE PREFERRED EMBODIMENTS

Figure 1:
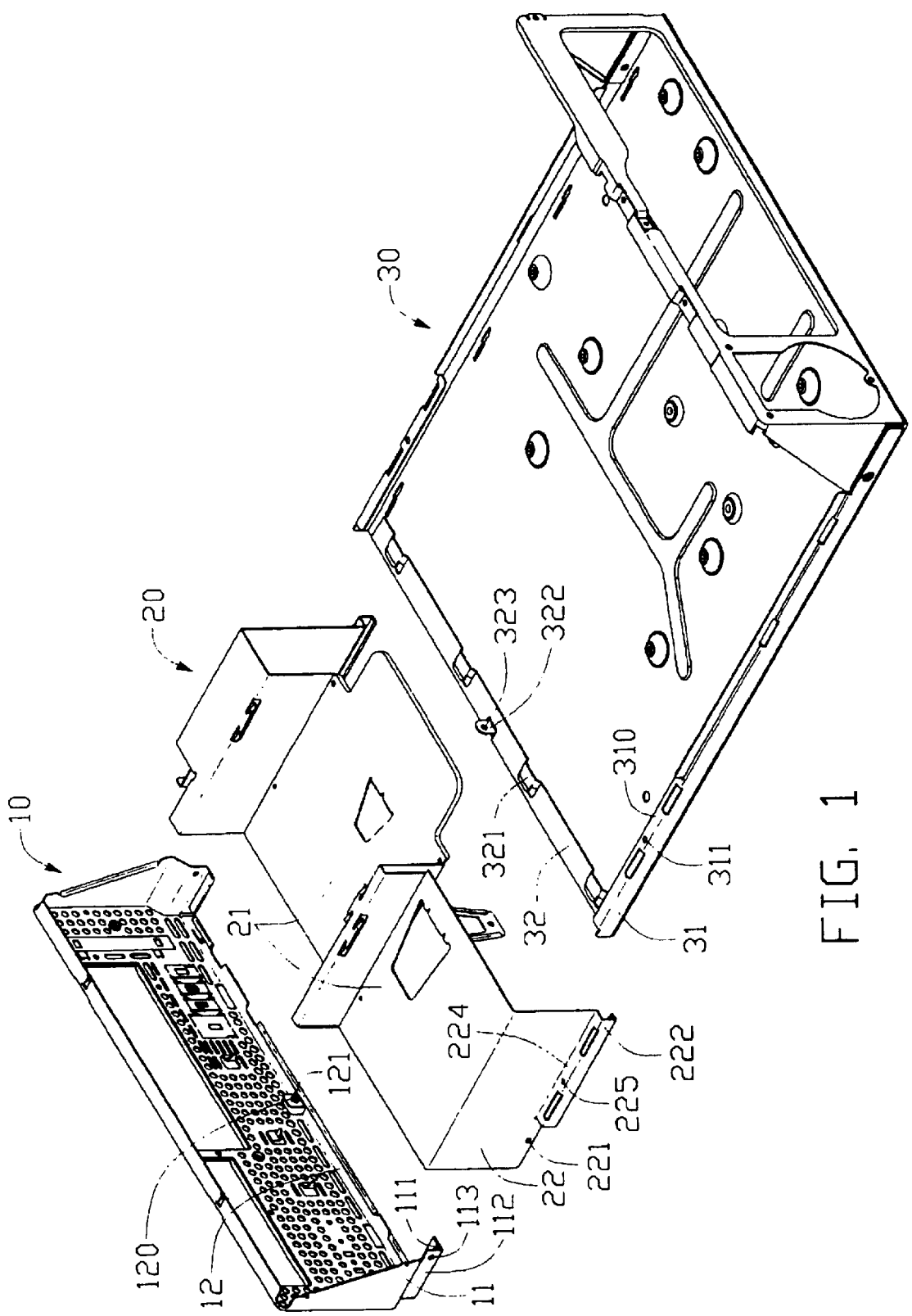
FIG. 1 is an exploded perspective view of a computer enclosure in accordance with a preferred embodiment of the present invention.
Figure 2:
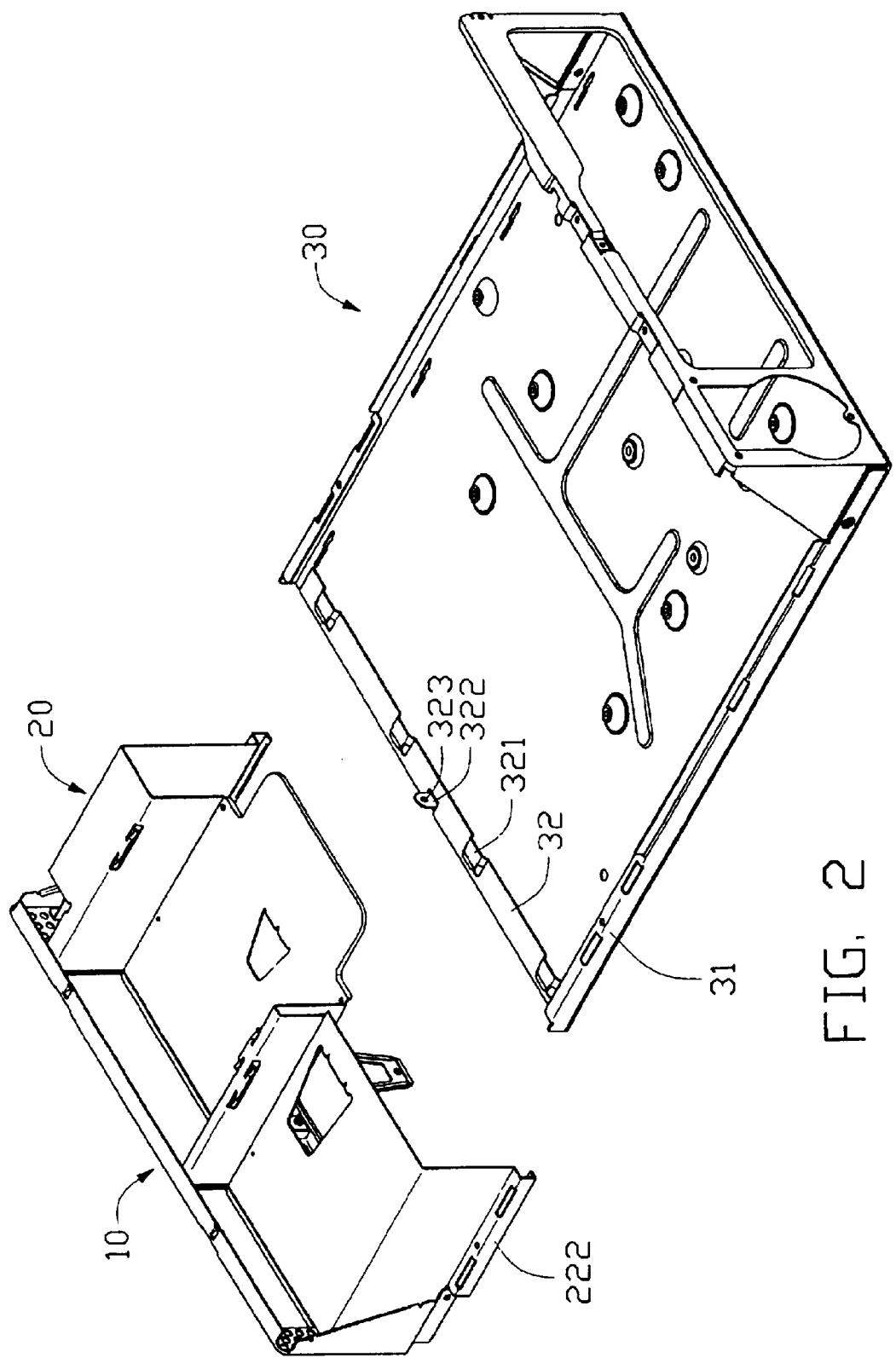
FIG. 2 is a partly assembled view of FIG. 1.
Figure 3:
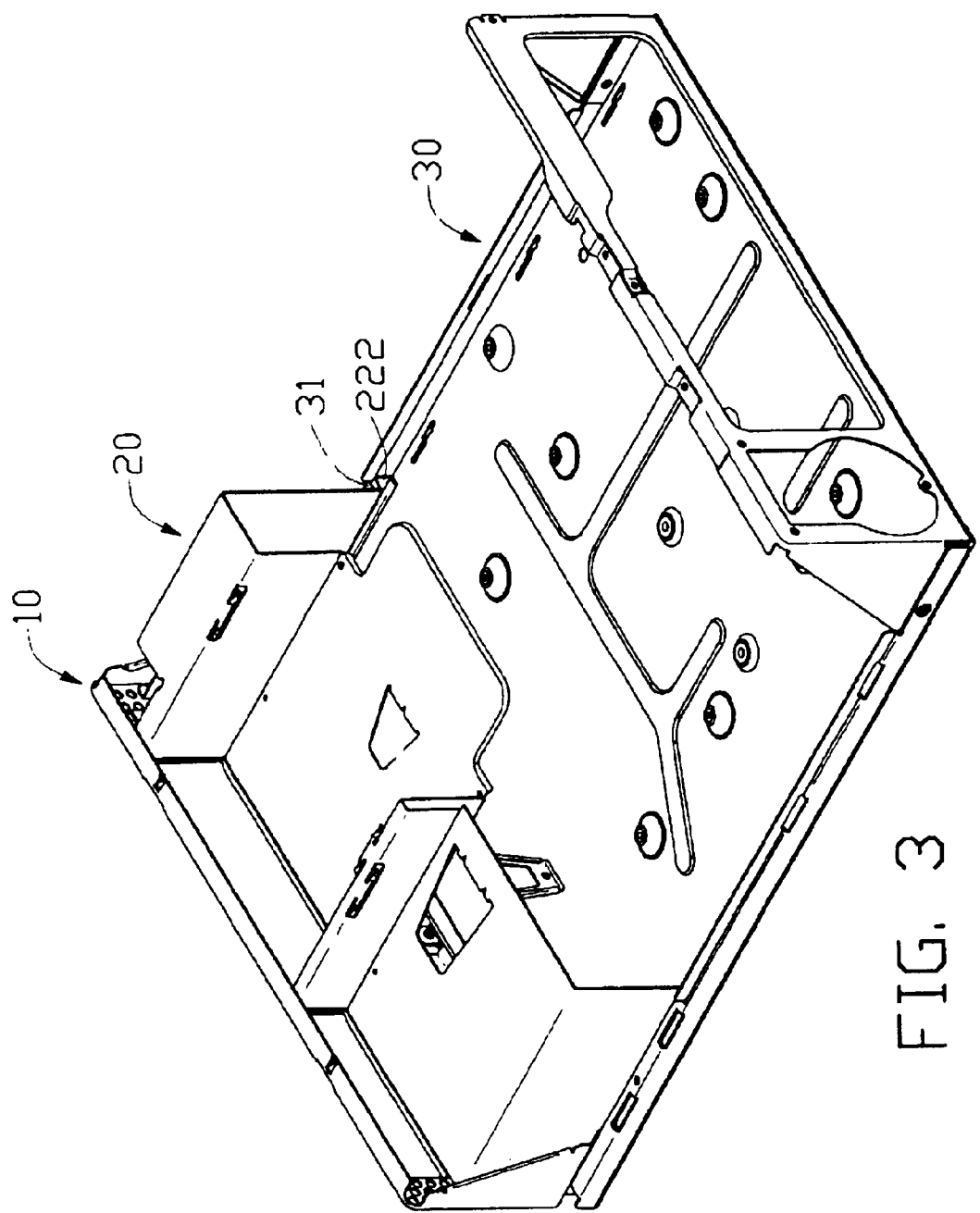
FIG. 3 is a fully assembled view of FIG. 1.

Referring to FIGS. 1 to 3, a computer enclosure in accordance with a preferred embodiment of the present invention comprises a front panel 10, a disk drive bracket 20 and a bottom panel 30.

The front panel 10 comprises two opposite side plates 11 and a bottom flange 12. The side plates 11 are bent rearwardly from opposite sides of the front panel 10. Each side plate 11 is substantially triangular. A bottom portion of the side plate 11 is bent inwardly to form a securing portion 111 having a generally L-shaped profile. A vertical side section 112 of the securing portion 111 defines a locking hole 113. The bottom flange 12 is bent rearwardly from the front panel 10. A tongue 120 extends upwardly from a middle portion of the bottom flange 12. A locking hole 121 is defined in the tongue 120.

The disk drive bracket 20 is integrally stamped from a sheet of metallic material, and comprises a pair of recessed portions 21. Disk drives (not shown) can be mounted in each recessed portion 21. The disk drive bracket 20 further comprises two sidewalls 22 depending from distal edges of the recessed portions 21 respectively. A front end of a bottom portion of each sidewall 22 defines a locking hole 221, corresponding to the locking hole 113 of a respective one of the securing portions 111 of the front panel 10. Rearwardly of the locking hole 221, the bottom portion of the sidewall 22 is bent outwardly, downwardly and inwardly to form a rail 222. The rail 222 comprises a top face 224, and a locking hole 225 is defined in the top face 224.

The bottom panel 30 comprises two parallel guiding channels 31 on opposite lateral sides thereof. The guiding channels 31 are at a front of the bottom panel 30, and can slidingly receive the rails 222 of the disk drive bracket 20. Each guiding channel 31 comprises a top face 310, and a locking hole 311 is defined in the top face 310. The locking hole 311 corresponds to a respective one of the locking holes 225 of the disk drive bracket 20. A plurality of evenly spaced latches 321 is formed in alignment across a front portion 32 of the bottom panel 30. The latches 321 are adapted to engage with the bottom flange 12 of the front panel 10. A tongue 322 extends upwardly from a middle section of the front portion 32, and a locking hole 323 is defined in the tongue 322. The locking hole 323 corresponds to the locking hole 121 of the front panel 10.

In assembly, the disk drive bracket 20 is attached to the front panel 10. The sidewalls 22 of the disk drive bracket 20 are slid between the securing portions 111 of the side plates 11 of the front panel 10. A screw (not shown) is inserted through each locking hole 113 and its corresponding locking hole 221 to secure the disk drive bracket 20 to the front panel 10. The combined front panel 10 and disk drive bracket 20 is then attached to the bottom panel 30. The rails 222 of the sidewalls 22 of the disk drive bracket 20 are slid into the guiding channels 31 of the bottom panel 30. The latches 321 of the bottom panel 30 engage with the bottom flange 12 of the front panel 10. The tongue 120 of the front panel 10 abuts the tongue 322 of the bottom panel 30. A screw (not shown) is inserted through each locking hole 323 and its corresponding locking hole 225. A further screw (not shown) is inserted through the locking holes 121, 323 to fasten the two tongues 120, 322 together. The combined front panel 10 and disk drive bracket 20 is thus secured to the bottom panel 30. The computer enclosure is completely assembled (see FIG. 3).

To perform maintenance, replacement or expansion of components (not shown) within the computer enclosure, the screws (not shown) securing the locking holes 225, 311 and the screw (not shown) securing the locking holes 121, 323 can be unscrewed. The disk drive bracket 20 is then slid outwardly from the bottom panel 30 along the guiding channels 31. The latches 321 are thus immediately disengaged from the bottom flange 12 of the front panel 10. Accordingly, the combined front panel 10 and disk drive bracket 20 can be easily moved away from the bottom panel 30 to make room for performing the maintenance, replacement or expansion. The screws (not shown) securing the locking holes 112, 221 can also be unscrewed to further facilitate the required operations.

Figure 5:
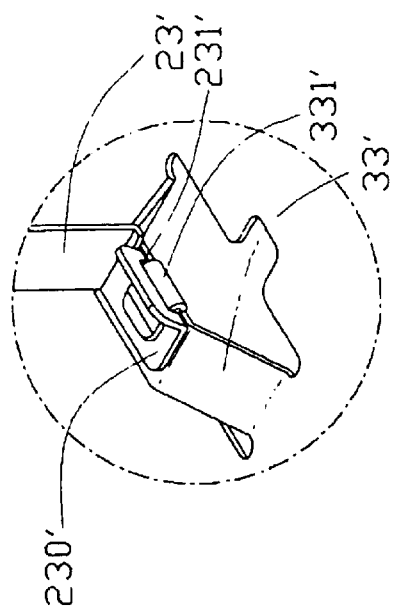
FIG. 5 is an enlarged view of a circled portion V of FIG. 4.
Figure 4:
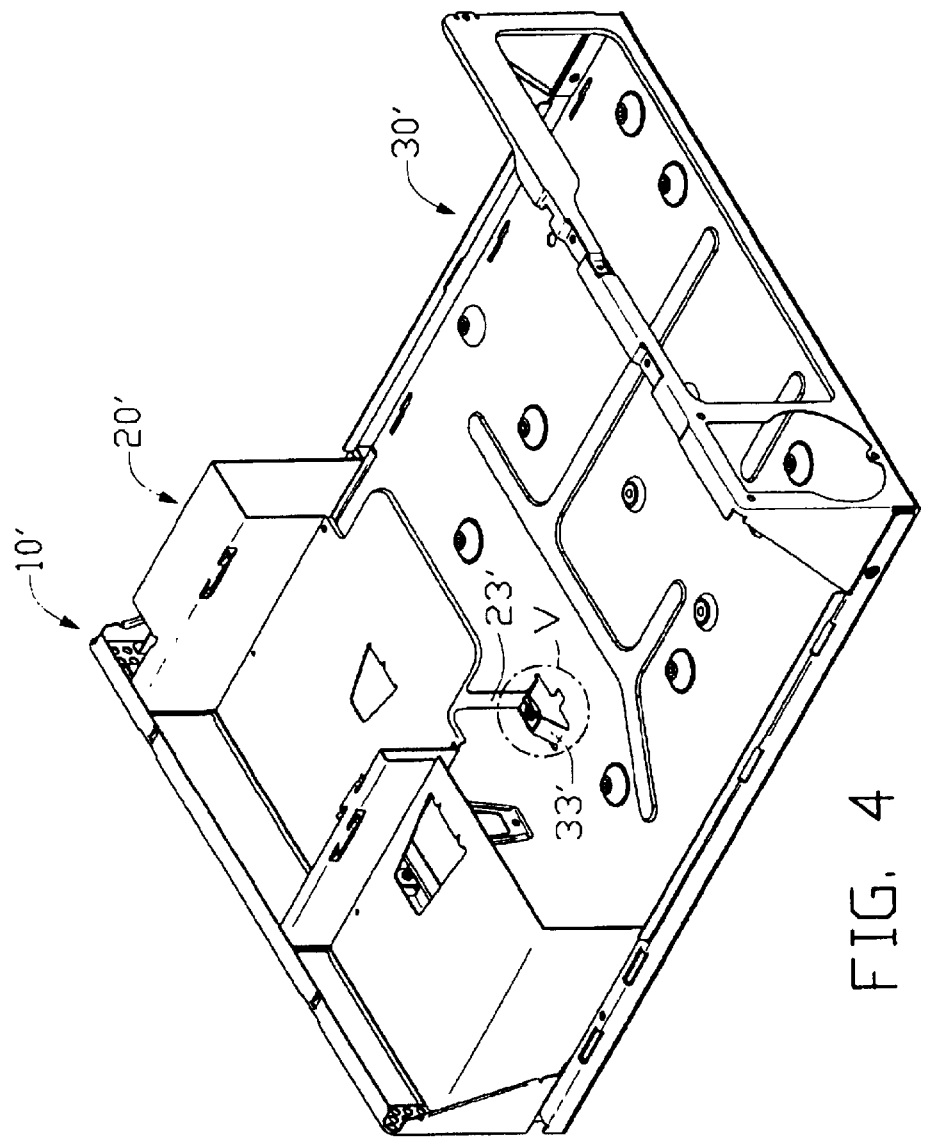
FIG. 4 is a fully assembled view of a computer enclosure in accordance with an alternative embodiment of the present invention.

FIGS. 4 and 5 show a computer enclosure in accordance with an alternative embodiment of the present invention. Such computer enclosure is similar to that of the preferred embodiment, and comprises a front panel 10', a disk drive bracket 20' and a bottom panel 30'. A support post 23' depends from a middle portion of a rear edge of the disk drive bracket 20'. A free end of the support post 23' is bent horizontally to form a locking portion 230'. The locking portion 230' comprises an upwardly slanting bent section at a rear thereof. A locking opening 231' is defined in the bent section. The bottom panel 30' is upwardly stamped to form a protrusion 33' that corresponds to the support post 23'. The protrusion 33' comprises a hook 331', for engaging in the locking opening 231'. In assembly, the front panel 10', the disk drive bracket 20' and the bottom panel 30' are assembled in the same way as described above in relation to the preferred embodiment. Then the locking opening 231' engagingly receives the hook 331'. The disk drive bracket 20' is thus securely supported by the support post 23', to prevent deformation of the disk drive bracket 20' once disk drives have been mounted therein.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure, comprising:
   a first panel comprising two side plates, the side plates being bent rearwardly from opposite sides of the first panel, a securing portion being arranged at a lower portion of each of the side plates;
   a disk drive bracket secured to the securing portions of the first panel and comprising two sidewalls, a rail being arranged at a lower portion of each of the sidewalls; and
   a second panel secured to the disk drive bracket and comprising two channels slidingly receiving the rails of the disk drive bracket.

2. The computer enclosure as claimed in claim 1, wherein each of the securing portions has a generally L-shaped profile and includes a side section, and a hole is defined in the side section.

3. The computer enclosure as claimed in claim 2, wherein each of the sidewalls of the disk drive bracket defines a hole corresponding to the hole of the side section of a respective one of the securing portions.

4. The computer enclosure as claimed in claim 3, wherein each of the sidewalls is bent outwardly, downwardly and inwardly to form a respective one of the rails.

5. The computer enclosure as claimed in claim 4, wherein each of the rails comprises a top face, and a hole is defined in the top face.

6. The computer enclosure as claimed in claim 5, wherein the channels are arranged at opposite lateral sides of the second panel.

7. The computer enclosure as claimed in claim 6, wherein each of the channels has a top face, and a hole is defined in the top face.

8. The computer enclosure as claimed in claim 7, wherein the first panel further comprises a lower flange bent inwardly therefrom.

9. The computer enclosure as claimed in claim 8, wherein a plurality of latches is arranged along a portion of the second panel corresponding to the lower flange of the first panel.

10. The computer enclosure as claimed in claim 9, wherein a tongue is arranged on the lower flange of the first panel, and a hole is defined in the tongue.

11. The computer enclosure as claimed in claim 10, wherein a tongue is arranged on said portion of the second panel that corresponds to the lower flange of the first panel, and a hole is defined in the tongue.

12. The computer enclosure as claimed in claim 1, wherein the disk drive bracket further comprises a support post depending from a rear portion of the disk drive bracket.

13. The computer enclosure as claimed in claim 12, wherein the second panel further comprises a protrusion stamped upwardly corresponding to the support post of the disk drive bracket.

14. The computer enclosure as claimed in claim 13, wherein the support post comprises a locking portion.

15. The computer enclosure as claimed in claim 14, wherein the locking portion defines an opening therein.

16. The computer enclosure as claimed in claim 15, wherein the protrusion of the second panel comprises a hook engaging in the opening of the locking portion.

17. A computer enclosure comprising:
   a bottom panel defining a pair of channels around two opposite side edges of a front portion thereof;
   a disk drive bracket defining a transverse dimension essentially equal to that of said bottom panel, and a pair of rails formed around a bottom portion of two side walls thereof, said disk drive bracket being assembled to the bottom panel in a front-to-back direction with the rails engaged within the corresponding channels, respectively; and
   a front panel including a pair of side plates, the sides plates being bent rearwardly from opposite sides of the front panel, and assembled to the bracket in said front-to-back direction to cover said bracket in said front-to-back direction.

18. The enclosure as claimed in claim 17, wherein said bottom panel, said front panel and said bracket are fastened to one another mutually.

* * * * *